(12) United States Patent
Fasoli et al.

(10) Patent No.: US 8,429,068 B1
(45) Date of Patent: Apr. 23, 2013

(54) DATA AGGREGATION FOR TRANSACTION BANKING PARTNERSHIPS

(75) Inventors: Jonathan David Fasoli, Aliso Viejo, CA (US); William Michael Dorsch, De Pere, WI (US); Christopher Chad Womack, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 13/179,302

(22) Filed: Jul. 8, 2011

(51) Int. Cl.
*G06Q 40/00* (2012.01)

(52) U.S. Cl.
USPC ............. 705/38; 705/35; 705/36 R; 705/39; 705/1.1; 705/44

(58) Field of Classification Search .................. 705/1.1, 705/38, 35, 36 R, 39, 44, 26.82, 75; 235/379, 235/380; 382/137, 116
See application file for complete search history.

(56) References Cited

U.S. PATENT DOCUMENTS

| 7,849,003 | B2 * | 12/2010 | Egnatios et al. ............... 705/38 |
| 7,937,319 | B2 * | 5/2011 | Kennis et al. ................... 705/38 |
| 2012/0054088 | A1 * | 3/2012 | Edrington et al. ............. 705/38 |

OTHER PUBLICATIONS

"Are They Really Lending Again?", Author: Maguire, Siobhan; Flynn, Dara ; Publication: Sunday Times {London (UK)] Mar. 22, 2009.*

* cited by examiner

*Primary Examiner* — John H Holly
(74) *Attorney, Agent, or Firm* — Osha Liang LLP

(57) ABSTRACT

A system and method to assign a score to an entity involved in a transaction where the score is used to manage risk for a transaction underwriter. In particular, the score represents the ability of the entity to fulfill a financial obligation separate from the transaction where failure to fulfill the financial obligation by the entity results in defaulting on the transaction. The score assigned to the entity may be determined by aggregating data obtained from multiple sources, such as accounting application, payroll application, inventory management application, personal financial management application, and/ or tax preparation application used by the entity.

24 Claims, 5 Drawing Sheets

DATA AGGREGATION FOR TRANSACTION BANKING PARTNERSHIPS

BACKGROUND

Underwriting refers to the process of assessing the eligibility of a customer to receive financial products (e.g., equity capital, insurance, mortgage, credit, etc.). The name derives from the historical maritime insurance market. Financial bankers, who would accept some of the risk on a given venture (historically a sea voyage with associated risks of shipwreck) in exchange for a premium, would literally write their names under the risk information that was written on a venture agreement.

A merchant account is a type of bank account that allows businesses to accept payments by a payment card, such as a debit or a credit card. A merchant account is part of merchant service provided by a debit/credit card payment processor and/or ISO (referred to as the merchant service provider) based on an agreement (referred to as the merchant service agreement) between a merchant (e.g., a retailer), a financial institution (e.g., a merchant bank that issues the debit/credit card), the payment processor and/or ISO for the settlement of debit/credit card transactions and any necessary financial institutions or independent sales organizations (ISOs). In particular, the payment processor and/or ISO may be a bank or underwritten by a bank. Specifically, the transaction steps in settling debit/credit card transactions include authorization, clearing, funding, and chargebacks. Generally, an ISO is an entity that solicits merchants on behalf of an Acquiring Bank for payment card acceptance and enables card payments from customers. An ISO generally holds responsibility for providing customer service, merchant-level support, merchant-level compliance with regulatory rules and underwriting of merchant accounts.

During the authorization step, the cardholder pays for the purchase and the merchant submits the transaction to the payment processor and/or ISO and/or ISO who verifies the credit card number, the transaction type, and the transaction amount with the card-issuing merchant bank before reserving the transaction amount from the cardholder's credit limit for the merchant. During the clearing step, the payment processor and/or ISO and/or ISO sends the transactions, typically in batches, through the credit card association, which debits the card-issuing merchant bank for payment and credits the payment processor and/or ISO and/or ISO. Essentially, the card-issuing merchant bank pays the payment processor and/or ISO for the transactions. Once paid, the payment processor and/or ISO, in turn, pays the merchant during the funding step. The merchant receives the transaction amount deducting various tiers of fees and/or required holdbacks to pay for the merchant service in processing the transactions. A chargeback is an event, typically initiated by the cardholder, when funds in a merchant account are held due to a dispute relating to the transaction. In the event of a chargeback, the card-issuing merchant bank returns the transaction to the payment processor and/or ISO for resolution. The payment processor and/or ISO then forwards the chargeback to the merchant, who must either accept the chargeback or contest it.

By providing the merchant service, the merchant service provider (i.e., the payment processor and/or ISO) underwrites the debit/credit card transactions in the sense that the merchant service provider bears the risk of paying the merchant in advance before a chargeback event and associated resolution effort/expense may occur.

A financial service provider that bears risk in a transaction typically charges the customer a fee in return. The fee may be in the form of interest or other charges. Salary advance is an example of a cash advance transaction. There is a large portion of the U.S. population that opts to receive an advance on their paychecks. It is difficult for an employee to get a reasonable cash advance on their paychecks. These individuals are victims to high interest rates charged by a salary advance operator and often suffer a negative payee experience when visiting an establishment with a poor reputation.

SUMMARY

In general, in one aspect, the invention relates to a system to manage risk for a transaction underwriter. The system includes (a) a hardware processor, (b) a plurality of financial management applications (FMAs) executing on the hardware processor and adapted to configure an accounting service account, a payroll service account, an inventory management account, and a tax preparation account to provide accounting service, payroll service, inventory management service, and tax preparation service, respectively, to an entity, (c) an aggregated score calculator coupled to the plurality of FMAs, executing on the hardware processor, and adapted to access the accounting service account, the payroll service account, the inventory management account, and the tax preparation account to obtain accounting data, payroll data, inventory management data, and tax filing data, respectively, of the entity, and to calculate a score based on the accounting data, the payroll data, the inventory management data, and the tax filing data using a pre-determined formula, wherein the score represents an ability of the entity to fulfill a financial obligation, (d) a transaction underwriting application coupled to the aggregated score calculator, executing on the hardware processor, and adapted to (i) receive a request for a transaction from a transaction requestor, wherein failure to fulfill the financial obligation by the entity results in defaulting on the transaction, (ii) evaluate, in response to the request, the score based on a pre-determined criterion, and (iii) send an executed transaction underwriting agreement to the transaction requestor in response to the score satisfying the pre-determined criterion, and (e) a repository configured to store the accounting data, the payroll data, the inventory management data, and the score. As used herein, the entity is defined as an individual, a business entity, and/or any other type of entity that can be involved in a transaction.

In general, in one aspect, the invention relates to a method to manage risk for a transaction underwriter. The method includes (a) determining, on a hardware processor of a computer system, a score of an entity by accessing an accounting service account, a payroll service account, a inventory management account, and a tax preparation account to obtain accounting data, payroll data, inventory management data, and tax filing data, respectively, of the entity, and calculating the score based on the accounting data, the payroll data, the inventory management data, and the tax filing data using a pre-determined formula representing an ability of the entity to fulfill a financial obligation, (b) receiving, by the transaction underwriter, a request for a transaction from a transaction requestor, wherein failure to fulfill the financial obligation by the entity results in defaulting on the transaction, (c) evaluating, in response to the request, the score based on a pre-determined criterion, and (d) sending an executed transaction underwriting agreement to the transaction requestor in response to the score satisfying the pre-determined criterion.

In general, in one aspect, the invention relates to a non-transitory computer readable medium storing instructions to manage risk for a transaction underwriter. The instructions when executed by a computer comprising functionality to (a)

determine a score of a entity by accessing an accounting service account, a payroll service account, a inventory management account, and a tax preparation account to obtain accounting data, payroll data, inventory management data, and tax filing data, respectively, of the entity, and calculating the score based on the accounting data, the payroll data, the inventory management data, and the tax filing data using a pre-determined formula representing an ability of the entity to fulfill a financial obligation, (b) receive, by the transaction underwriter, a request for a transaction from a transaction requestor, wherein failure to fulfill the financial obligation by the entity results in defaulting on the transaction, (c) evaluate, in response to the request, the score based on a pre-determined criterion, and (d) send an executed transaction underwriting agreement to the transaction requestor in response to the score satisfying the pre-determined criterion.

Other aspects of the invention will be apparent from the following detailed description and the appended claims.

DETAILED DESCRIPTION

Figure 1:
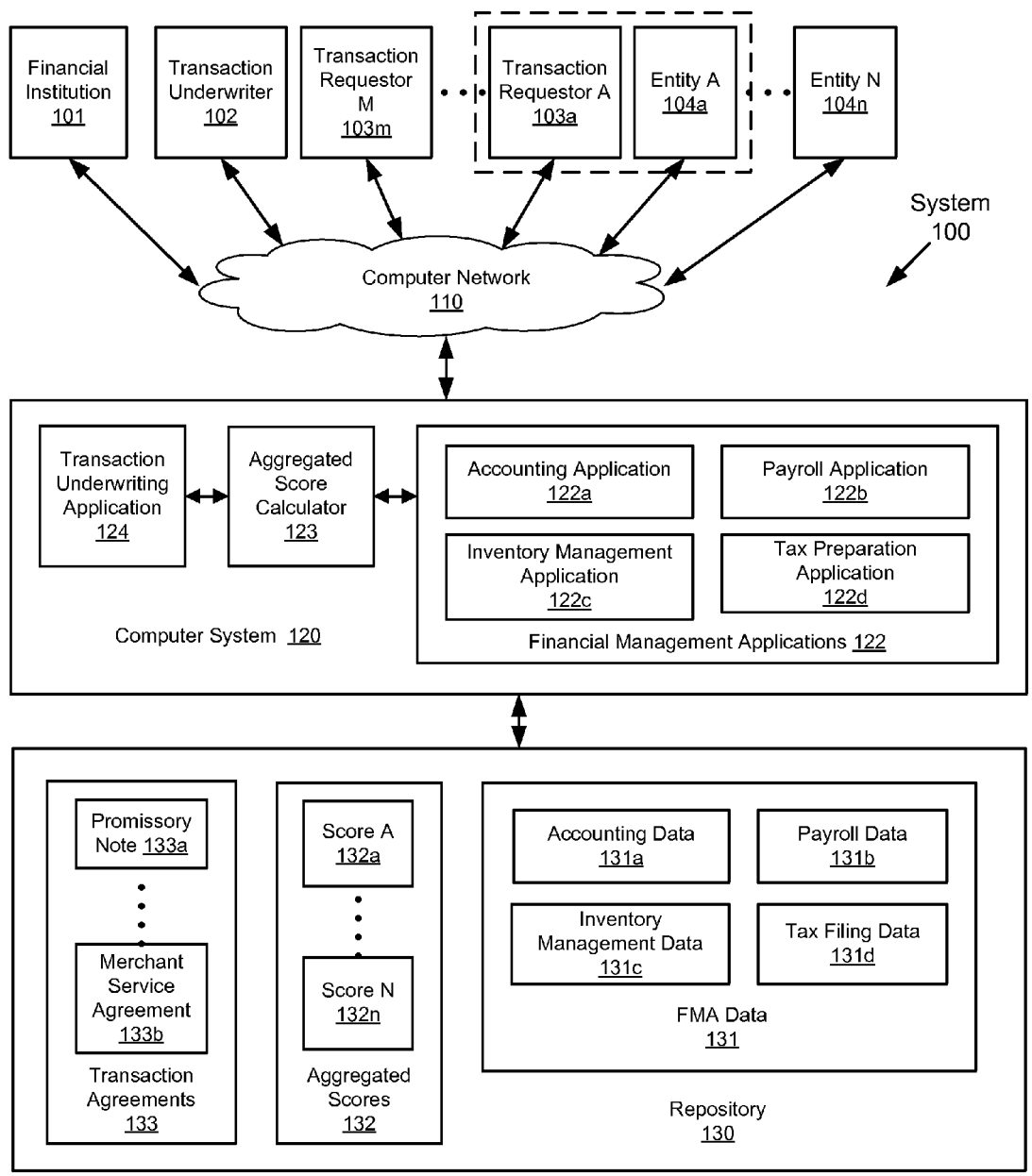
FIG. 1 shows a schematic diagram of a system of data aggregation for banking partnerships in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method to assign a score to an entity involved in a transaction where the score is used to manage risk for a transaction underwriter. As used in this disclosure, the entity is defined as an individual, a business entity, and/or any other type of entity that can be involved in a transaction. The score represents the ability of the entity to fulfill a financial obligation separate from the transaction where failure to fulfill the financial obligation by the entity results in defaulting on the transaction.

For example, the transaction may include a credit card payment processor and/or ISO paying a merchant in advance before any chargeback event may occur. Such chargeback event may be a result of the merchant's failure to fulfill the business obligation, which is timely delivery of merchandise purchased using the credit card. In such example, the entity is the merchant while the transaction underwriter is the credit card payment processor and/or ISO who bears the risk of non-performance by the entity regarding the business obligation. If the score assigned to the merchant does not meet a minimum score threshold, high risk is associated with providing merchant service to the merchant for the credit card payment processor and/or ISO. Accordingly, the credit card payment processor and/or ISO may charge a higher processing fee under the merchant service agreement (i.e., credit card payment processing agreement) or may not agree to process credit card transactions for the merchant.

In another example, the transaction may include a salary advance provided by a financial institution to an employee of an entity in advance before a paycheck is issued by the entity to the employee. Generally, the employee receives an amount equaling the salary, deducting any interest assessed by the financial institution. Additional fees (e.g., in the form of a discount rate) may also be charged by a transaction underwriter who is a creator of a salary advance promissory note representing a contractual arrangement of the salary advance. In essence, the transaction underwriter underwrites the salary advance promissory note for selling to the financial institution. From time to time, the entity (i.e., an employer) may encounter financial difficulty and fail to fulfill the business obligation, which is timely issuance of the paycheck. Consequently, an individual may encounter personal financial difficulty and fail to fulfill their personal obligation, which is timely repayment of the cash advance. In both scenarios, the transaction underwriter bears the risk, based on an underwriting agreement, of non-performance by the entity regarding the financial obligation. As a result, the transaction underwriter may charge a higher fee (e.g., discount rate) to the employee seeking salary advance if the score assigned to the individual or employer is below a minimum score threshold thus indicating a high risk for the transaction underwriter.

In one or more embodiments of the invention, the score assigned to the entity may be determined by aggregating data obtained from multiple sources, such as accounting application, payroll application, inventory management application, personal financial management application and/or tax preparation application used by the entity. In one or more embodiments, the score may be calculated by an application service provider providing metered usage of the accounting application, payroll application, inventory management application, personal financial management application and/or tax preparation application to the entity. In such embodiments, under the application service agreement, the application service provider may have access to the accounting application data, payroll application data, inventory management application data, personal financial management application data and tax filing data of the entity for calculating the score based on aggregating such data. In one or more embodiments, such aggregated data may include cash flow/working capital ratio, length of business tenure, number of employees, industry category, personal and/or business location, account balances, credit card processing data, debit card processing data, inventory turnover ratio, receivables schedule, transaction types, etc.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1. The system (100) of FIG. 1 depicts the components of a data aggregation system for assessing transaction banking partnerships in accordance with embodiments disclosed herein.

As shown in FIG. 1, the system (100) includes financial institution (101), transaction underwriter (102), transaction requestors (e.g., transaction requestor A (103a), transaction requestor M (103m), etc.), business entities (e.g., entity A (104a), entity N (104n), etc.), and computer system (120). As shown, these components are coupled via computer network (110). For example, the computer network (110) may include wired and/or wireless portions of the Internet and/or other data communications networks such as wide area networks (WANs), local area networks (LANs), etc. Further, the computer system (120) is configured to execute financial management applications (FMAs) (122), aggregated score calculator (123), and transaction underwriting application (124). The FMAs (122), aggregated score calculator (123), and transaction underwriting application (124) may be software applications installed onto the computer system (120). As shown, the FMAs (122) include accounting application (122a), payroll application (122b), inventory management application (122c), and tax preparation application (122d).

The system (100) includes repository (130) operatively coupled to the computer system (120). The repository (130) is configured to store aggregated scores (132) (e.g., score A (132a), score N (132n), etc. corresponding to entity A (104a), entity N (104n), etc., respectively) and FMA data (131) associated with the business entities (e.g., entity A (104a), entity N (104n), etc.). The FMA data (131) may include accounting data (131a), payroll data (131b), inventory management data (131c), and tax filing data (131d). The repository (130) may also be used for storing transaction agreements (133) (e.g., promissory note (133a), merchant service agreement (133b), etc.). In one or more embodiments, the repository (130) is a persistent storage device (or set of devices) and is configured to store data for use by the FMAs (122), aggregated score calculator (123), and transaction underwriting application (124). The repository (130) (and/or any of the transaction agreements (133), aggregated scores (132), and FMA information (131) stored therein) may be a data store such as a database, a file system, or one or more data structures (e.g., arrays, link lists, tables, hierarchical data structures, etc.) configured in memory or any other suitable medium for storing data. The repository (130) may be a device internal to the computer system (120). Alternatively, the repository (130) may be an external storage device operatively connected to the computer system (120).

Although a specific number of each component depicted in FIG. 1 is described above, one skilled in the art, with the benefit of this disclosure, will appreciate that embodiments of the invention may include different number of each component in the system (100). For example, any number of business entities and/or transaction requestors may exist in the system (100), any number of individual applications may exist in the FMAs (122), etc.

Generally speaking, the business entities (e.g., entity A (104a), entity N (104n), etc.) and transaction requestors (e.g., transaction requestor A (103a), transaction requestor M (103m), etc.) may be individuals (e.g., a sole proprietor, small business owner (SBO), salaried employee, etc.) or business organizations (e.g., a store, a vendor, a corporation, etc.). In particular, an entity (e.g., entity A (104a), entity N (104n)) uses FMAs (122) to manage business activities and takes on business obligations during the course of conducting such business activities. Examples of business obligation include timely delivery of merchandise ordered by customers, timely issuance of employee paychecks to employees, etc. As noted above, the ability of a transaction requestor (e.g., transaction requestor A (103A), transaction requestor M (103m)) to avoid defaulting on the advanced cash fund of the transaction depends on performance of fulfilling a business obligation by an entity associated with the transaction. Transaction default may include the credit card chargeback event or failure to pay back the salary advance.

In an example described above, the ability of an employee (e.g., transaction requestor M (103m)) to pay back salary advance depends on the employer's (e.g., entity N (104n)) timely issuance of paychecks (i.e., fulfilling a business obligation). In another example described above, the ability of a merchant (e.g., transaction requestor A (103a)) to avoid credit card payment chargeback events, which forfeits the transaction, depends on the merchant's (e.g., entity A (104a)) timely delivery of merchandise (i.e., fulfilling a business obligation) purchased by a customer using a credit card. In this example, the transaction requestor A (103a) and the entity A (104a) are the same entity shown in FIG. 1 as bounded within a dash line box.

In one or more embodiments of the invention, the performance trend of a entity in fulfilling its business obligation is assessed by the transaction underwriter (102) by way of the aggregated scores (132), which are calculated based on the FMA data (131) and assigned to the business entities (e.g., entity A (104a), entity N (104n), etc.). Accordingly, financial institution (101) provides payments according to transaction agreements (133) created based on the aggregated scores (132). In this context, the financial institution (101) and the transaction underwriter (102) form a transaction banking partnership.

In the salary advance example described above, the cash advance agreement may be a salary advance promissory note (133a), based on which the employee (e.g., cash advance requestor M (103m)) receives salary advance (i.e., cash advance) originating from the financial institution (101). In particular, interest rate and other fees of the promissory note (133a) may be adjusted/customized based on score N (132n) assigned to the employer (e.g., entity N (104n)) obligated to issue paychecks to the employee. If the employer fails to issue the paychecks on time, the employee may not be able to pay back the salary advance in a timely manner. Expenses associated with such risk of failure to issue paychecks may be absorbed by the financial institution (101) and the cash advance underwriter (102) based on the aforementioned interest rate and other fees.

In the credit card payment processing example described above, the transaction agreement may be a merchant service agreement (133b), based on which the merchant (e.g., transaction requestor A (103a)) receives credit card payment originating from the financial institution (101). In this example, the merchant service agreement (133b) may also be referred to as a transaction underwriting agreement. In this regard, the terms "transaction agreement" and "transaction underwriting agreement" may be used interchangeably throughout this disclosure depending on the context.

In one or more embodiments, the credit card payment processing fee schedule specified within the merchant service agreement (133b) may be adjusted/customized based on score A (132a) assigned to the merchant (e.g., entity A (104a) as the same entity as transaction requestor A (103a)) obligated to deliver merchandise purchased by a customer. If the merchant processes the credit card payment but fails to deliver the merchandise on time, credit card payment dispute may be initiated by the credit card holder resulting in a chargeback event for the financial institution (101). Before the chargeback is delivered to the financial institution (101), the payment processor and/or ISO would be financially responsible for settling the chargeback claim. If they are unable to fund it, then it would be sent to the financial institution (101). Expenses associated with such risk of chargeback event may be absorbed by the financial institution (101) and the transaction underwriter (102) based on the aforementioned credit card payment processing fee.

Turning to each of the components within the computer system (120), in one or more embodiments of the invention, the FMAs (122) are configured to provide functionality to an entity (e.g., entity A (104a), entity N (104n), etc.) for managing business activities based on the FMA data (131) stored in the repository (130). For example, in one or more embodiments, the business activities may include receiving orders, performing shipments, processing credit applications and return requests, issuing invoices, collecting payments, filing tax returns, hiring employees, issuing paychecks, managing personal finances, filing tax returns etc. As previously noted, these personal and business activities may result in various financial obligations described in the examples above. In one or more embodiments, the FMAs (122) may include an accounting software, an order entry and inventory control software, or other types of personal and/or business financial management software for managing these business activities. For example, the accounting application (122a) may be QuickBooks® (a registered trademark of Intuit Inc., Mountain View, Calif.).

In one or more embodiments, the accounting application (122a), payroll application (122b), inventory management application (122c), and tax preparation application (122d), together depicted as the FMAs (122), may be separate stand alone software or modules integrated within a single software. In one or more embodiments, such separate stand alone software or single software may be provided by an application service provider (not shown) offering services to the business entities (e.g., entity A (104a), entity N (104n), etc.). In one or more embodiments, the transaction underwriter (102) may have access to accounting data (131a), payroll data (131b), inventory management data (131c), and tax filing data (131d) for transaction underwriting purposes under application service agreements established among the application service provider, the transaction underwriter, (102) and the business entities (e.g., entity A (104a), entity N (104n), etc.). In one or more embodiments, the transaction underwriter (102) may be the application service provider.

In one or more embodiments of the invention, the accounting application (122a), payroll application (122b), inventory management application (122c), and tax preparation application (122d) are each configured to configure an accounting service account, a payroll service account, an inventory management account, and a tax preparation account to provide accounting service, payroll service, inventory management service, and tax preparation service, respectively, to a entity (e.g., entity A (104a), entity N (104n), etc.). In one or more embodiments, separate accounts are configured for each entity. For example, the accounts for the entity A (104a) are separate from the accounts for the entity N (104n). As described above, records of business activities may be stored in such accounting service account, payroll service account, inventory management account, and tax preparation account as FMA data (131), which includes accounting data (131a), payroll data (131b), inventory management data (131c), and tax filing data (131d).

In one or more embodiments of the invention, the transaction underwriter (102) uses the aggregated score calculator (123) and the transaction underwriting application (124) to determine whether, and based on what terms, to underwrite transaction agreements (133). In one or more embodiments of the invention, the aggregated score calculator (123) is configured to access the accounting service account, payroll service account, inventory management account, and tax preparation account to obtain accounting data (131a), payroll data (131b), inventory management data (131c), and tax filing data (131d), respectively, for analysis. For example, such analysis may generate key business parameters indicative of performance of the entity in conducting the aforementioned business activities and fulfilling associated business obligations. In one or more embodiments, such key business parameters include cash flow/working capital ratio, length of business tenure, number of employees, industry category, business location, account balances, times interest earned, current ratio, credit card processing data, debit card processing data, inventory turnover ratio, receivables schedule, and transaction types.

In one or more embodiments, the aggregated score calculator (123) is further configured to calculate an aggregated score (e.g., score A (132a), score N (132n), etc.) based on the accounting data (131a), payroll data (131b), inventory management data (131c), and tax filing data (131d) using a pre-determined formula. In particular, the aggregated score represents the ability of corresponding entity (e.g., entity A (104a), entity N (104n), etc.) to fulfill its pending and future financial obligations. For example, the aggregated score may be based on a pre-determined scale, such as a scale from 1 through 100, a scale from A through Z, a percentile scale, etc. In one or more embodiments, the aggregated score calculator (123) uses separate formulae to calculate a separate score (not shown) for each of the aforementioned key business parameters. For example, each of the cash flow/working capital ratio, length of business tenure, number of employees, industry category, business location, account balances, credit card processing data, debit card processing data, inventory turnover ratio, receivables schedule, and transaction types may be compared to pre-determined ranges or categories each associated with an individual score value. In one example, if the cash flow/working capital ratio of the entity A (104a) falls within a particular range (e.g., one of "below 0.1," "0.1 through 0.5," "0.5 through 1.0, 1.0 through 5," etc.), a cash flow/working capital ratio score (not shown) associated with the particular range is assigned to the entity A (104a) by the aggregated score calculator (123). In another example, if the business location of the entity A (104a) corresponds to a particular category (e.g., one of metropolitan location, suburban location, rural location, etc.), a business location score (not shown) associated with the particular category is assigned to the entity A (104a) by the aggregated score calculator (123). In one or more embodiments, the pre-determined formula used by the aggregated score calculator (123) may include a weighted average formula based on the separate score for each of the aforementioned key business parameters. For example, the aggregated score A (132a) assigned to the entity A (104a) may be a weighted sum of separate scores for the aforementioned key business parameters of the entity A (104a).

In one or more embodiments of the invention, the transaction underwriting application (124) is configured to receive a request for transaction from a transaction requestor (e.g., transaction requestor A (103a), transaction requestor M (103m), etc.). In particular, the ability of the transaction requestor to avoid defaulting on the transaction is dependent on an entity (e.g., entity A (104a), entity N (104n), etc.), associated with the transaction, fulfilling its financial obligation separate from the transaction. This entity associated with the transaction is referred to as the associated entity.

In one or more embodiments, the transaction underwriting application (124) is configured to evaluate, in response to the request, the aggregated score (e.g., score A (132a)) assigned to the associated entity (e.g., entity A (104a)) based on a pre-determined criterion. For example, the aggregated score A (132a) may be compared to a minimum score threshold to determine if the aggregated score A (132a) satisfies the predetermined criterion. In one or more embodiments, the minimum score threshold has a pre-determined static value determined based on risk assessment of the transaction underwriting. In one or more embodiments, the minimum score threshold is adjusted based on profit/loss performance of actual transaction underwriting activities under the transaction banking partnership. In response to the aggregated score A (132a) assigned to the associated entity A (104a) satisfying the pre-determined criterion, the transaction underwriter (102) may decide to underwrite the requested transaction and determine particular details of the transaction underwriting agreements (133). In one or more embodiments, the transaction underwriting application (124) sends a customized transaction underwriting agreement (e.g., promissory note (133a), merchant service agreement (133b), etc.) to the transaction requestor (e.g., transaction requestor A (103a), transaction requestor M (103m), etc.) for execution (i.e., authorized signing of signatures). Accordingly, an executed transaction underwriting agreement may be generated and sent to the transaction requestor prior to the financial institution (101) providing payment of the transaction.

In one or more embodiments of the invention, the transaction requestor A (103a) is a merchant accepting a credit card payment in a transaction to purchase an item from the merchant by a credit card holder (not shown). In such embodiments, the entity A (104a) is the same merchant and the business obligation includes delivering the item to the credit card holder by the merchant to complete the transaction. Further, the request for transaction includes requesting a merchant account for processing the credit card payment. As described above, the credit card payment includes a payment paid to the merchant in response to the merchant shipping the item and prior to the credit card holder receiving the item. For example, the merchant receives an order for the item from the credit card holder and processes the credit card payment upon shipping the item. If the merchant processes the credit card payment but fails to ship the correct item on time, the credit card holder may initiate a dispute resulting in a chargeback event. Accordingly, the transaction underwriter (102) determines whether to approve the request for the merchant account and provide merchant service to the requesting merchant based on the score A (132a) assigned to the merchant (i.e., entity A (104a)).

In such embodiments described above, the executed transaction underwriting agreement is the merchant service agreement (133b) signed by the transaction underwriter (102) and the merchant. In particular, the merchant service agreement (133b) represents a contractual arrangement of using the merchant account to process the credit card payment for the merchant by the transaction underwriter (102). Further, in response to executing (i.e., signing) the merchant service agreement (133b) and sending to the merchant for creating the merchant account, the transaction underwriting application (124) is configured to include transaction capabilities in the merchant account for the merchant.

In one or more embodiments of the invention, the transaction requestor M (103m) is an employee receiving salary from an employer, which is the entity N (104n). In such embodiments, the business obligation includes paying the salary to the employee according to a salary payment schedule. Further, the request for transaction includes requesting a salary advance paid to the employee preceding the salary payment schedule. If the employer fails to issue the paychecks on time, the employee may not be able to pay back the advanced salary. Accordingly, the transaction underwriter (102) determines whether to approve the salary advance request and present to the financial institution (101) for funding the salary advance based on the score N (132n) assigned to the employer (i.e., entity N (104n)).

In such embodiments described above, the executed transaction underwriting agreement is the salary advance promissory note (133a) signed by the financial institution (101) and the employee, where the salary advance promissory note (133a) represents a contractual arrangement of the salary advance. In such embodiments, the transaction underwriting application (124) is further configured to create the salary advance promissory note (133a) and determine a grade of the salary advance promissory note (133a) based on the score A (132a) assigned to the employer (i.e., entity N (104n)). For example, the grade may be one of premium grade, regular grade, high yield grade, not credit worthy grade, etc. determined by comparing the score A (132a) to a pre-determined score range associated with each of these grades. For example, the score range of 90 through 100 may correspond to the premium grade, the score range of 70 through 89 may correspond to the regular grade, the score range of 55 through 69 may correspond to the high yield grade, the score range of 0 through 54 may correspond to the not credit worthy grade. Further, the transaction underwriting application (124) is configured to present the salary advance promissory note (133a) to the financial institution (101) for approval based on the grade. Still further, the transaction underwriting application (124) is configured to facilitate payment of the salary advance in response to the financial institution (101) approving and executing the salary advance promissory note (133a).

Although not explicitly shown in FIG. 1, the computer system (120) may also include a personal financial management application configured to provide functionality for the employee to manage his/hers cash flow, asset allocation, tax preparation and filing, etc. It is contemplated that the aggregated score A (132a) may also be based on statistics compiled from such personal financial management application and representing credit worthiness of the employee.

In one or more embodiments, the transaction underwriting application (124) is further configured to bundle the salary advance promissory note (133a) in a collection of salary advance promissory notes associated with employees receiving salaries from a number of different employers. In particular, the score associated with each of the salary advance promissory notes in the collection (referred to as a tranche) is within a pre-determined range, from which an aggregated grade of the tranche is determined. For example, the tranche may be a premium grade tranche, a regular grade tranche, a high yield tranche, a premium-regular grade tranche, a regular-high yield tranche, etc.

In one or more embodiments of the invention, one or both of the aggregated score calculator (123) and the transaction underwriting application (124) may be stand-alone software in communication with the FMAs (122), an installable add-on module of the FMAs (122), an optional functional module within the FMAs (122), or a standard feature built-in within the FMAs (122). In one or more embodiments of the invention, one or both of the aggregated score calculator (123) and the transaction underwriting application (124) may be operated by an application service provider of the FMAs (122) or by a third party separate from the application service provider of the FMAs (122). For example, the aggregated score calculator (123) and the transaction underwriting application (124) may be operated by the transaction underwriter (102).

Figure 2:
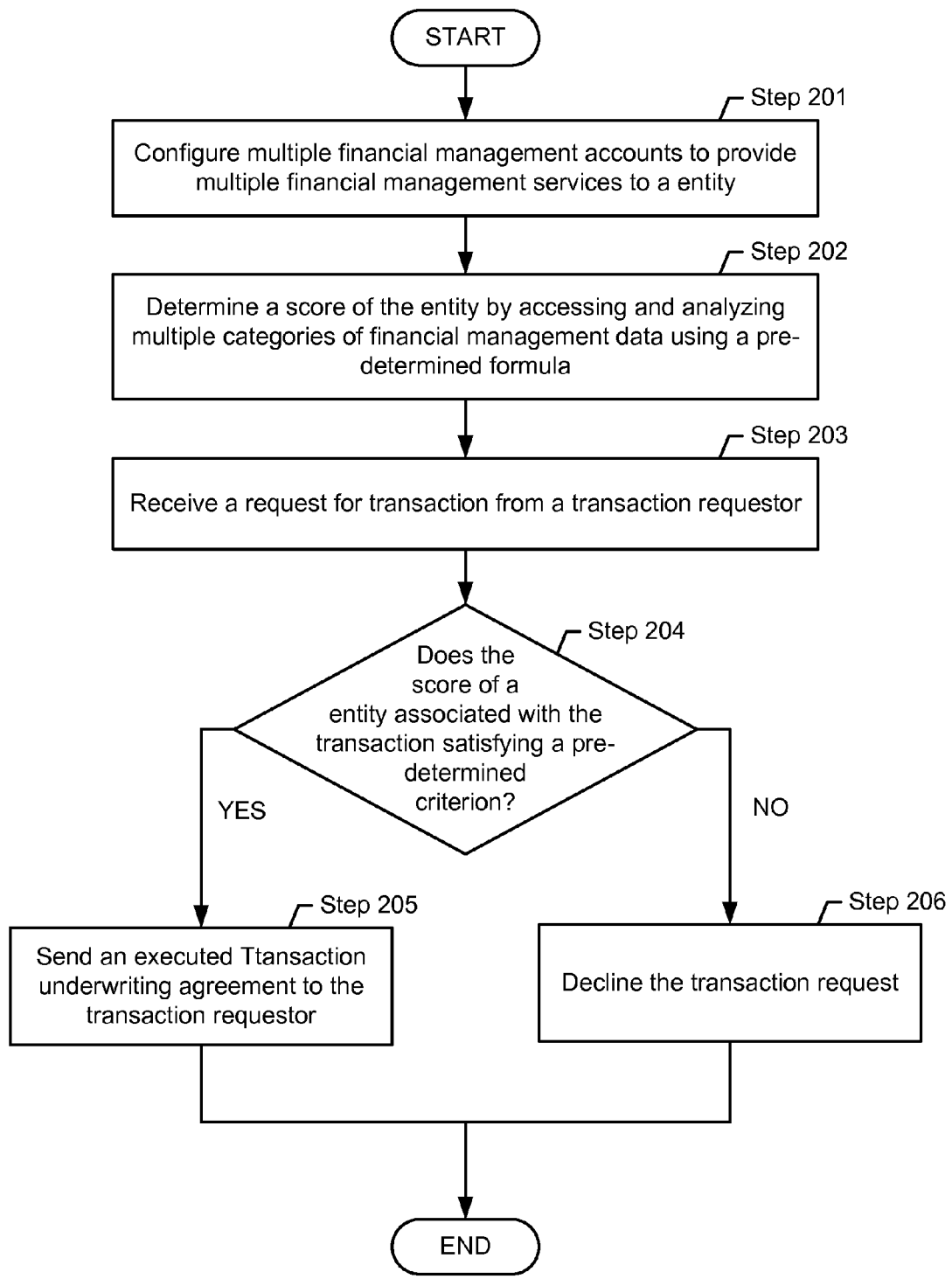
FIG. 2 shows a flowchart of a method of data aggregation for banking partnerships in accordance in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments, the method described in reference to FIG. 2 may be practiced using the system (100) described in reference to FIG. 1 above.

Initially in Step 201, multiple financial management accounts (e.g., accounting service account, payroll service account, inventory management account, tax preparation account, etc.) are configured to provide multiple financial management services to an entity. In one or more embodiments of the invention, these multiple financial management accounts are configured to provide functionality to the entity for managing business activities based on multiple categories of financial management data stored in these accounts. For example, in one or more embodiments, the business activities may include receiving orders, performing shipments, processing credit applications and return requests, issuing invoices, collecting payments, filing tax returns, hiring employees, issuing paychecks, filing tax returns etc. In one or more embodiments, records of such business activities may be stored in these financial management accounts as accounting data, payroll data, inventory management data, and tax filing data. As previously noted, these business activities may result in various business and/or financial obligations.

In one or more embodiments, these multiple financial management accounts may be accounts for separate stand alone software or for modules integrated within a single software. For example, one of these separate stand alone software or single software may be QuickBooks® (a registered trademark of Intuit Inc., Mountain View, Calif.). In one or more embodiments, such separate stand alone software or single software may be provided by an application service provider offering services to the entity. In one or more embodiments, a transaction underwriter may have access to the aforementioned financial management data stored in these accounts for transaction underwriting purposes under application service agreements established among the application service provider, the transaction underwriter, and the entity. In one or more embodiments, the transaction underwriter may be the application service provider.

In Step 202, a score of the entity is determined by accessing and analyzing multiple categories of financial management data using a pre-determined formula. In one or more embodiments of the invention, the transaction underwriter relies on such score to determine whether, and based on what term, to underwrite a requested transaction. In one or more embodiments, accounting data, payroll data, inventory management data, and tax filing data are obtained from the accounting service account, payroll service account, inventory management account, and tax preparation account for analysis. For example, such analysis may generate key business parameters indicative of performance of the entity in conducting the aforementioned business activities and fulfilling associated business obligations. In one or more embodiments, such key business parameters include cash flow/working capital ratio, length of business tenure, number of employees, industry category, business location, account balances, credit card processing data, debit card processing data, inventory turnover ratio, receivables schedule, and transaction types.

In one or more embodiments, an aggregated score is calculated based on the accounting data, payroll data, inventory management data, and tax filing data using a pre-determined formula. In particular, the aggregated score represents the ability of the entity to fulfill its pending and future business and financial obligations. For example, the aggregated score may be based on a pre-determined scale, such as a scale from 1 through 100, a scale from A through Z, a percentile scale, etc. In one or more embodiments, separate formulae are used to calculate a separate score (not shown) for each of the aforementioned key business parameters. For example, each of the cash flow/working capital ratio, length of business tenure, number of employees, industry category, business location, account balances, credit card processing data, debit card processing data, inventory turnover ratio, receivables schedule, and transaction types may be compared to pre-determined ranges or categories each associated with an individual score value. In one example, if the cash flow/working capital ratio of the entity falls within a particular range (e.g., one of "below 0.1," "0.1 through 0.5," "0.5 through 1.0, 1.0 through 5," etc.), a cash flow/working capital ratio score (not shown) associated with the particular range is assigned to the entity. In another example, if the business location of the entity corresponds to a particular category (e.g., one of metropolitan location, suburban location, rural location, etc.), a business location score associated with the particular category is assigned to the entity. In one or more embodiments, the pre-determined formula may include a weighted average formula based on the separate score for each of the aforementioned key business parameters. For example, the aggregated score may be a weighted sum of separate scores for the aforementioned key business parameters of the entity.

In Step 203, a request for transaction associated with the entity is received from a transaction requestor. In particular, the ability of the transaction requestor to avoid defaulting the transaction is dependent on the entity to fulfill its business obligation separate from the transaction. For example, the request for transaction may be a request for a merchant account for processing credit card payment for the entity, which is a merchant. In one or more embodiments, the request is for setting a new merchant account with capabilities to process credit payment. In one or more embodiments, the request is for adding credit card payment capabilities to a pre-existing merchant account. In this example, the transaction requestor is the same merchant and the business obligation is for the merchant to ship merchandise purchased by the credit card holder in a timely fashion to avoid credit card chargeback events. In another example, the request for transaction may be a request for a salary advance paid to an employee by an underwriting financial institution, where the salary is normally paid by the employer (entity). In this example, the business obligation is for the employer to issue paychecks to the employee in a timely fashion to avoid the employee defaulting on paying back the advanced salary fund.

In Step 204, the aggregated score assigned to the entity associated with the transaction is evaluated, in response to the request, to determine whether the score satisfies a pre-determined criterion. For example, the aggregated score may be compared to a minimum score threshold to determine if it satisfies the pre-determined criterion. In one or more embodiments, the minimum score threshold has a pre-determined static value determined based on risk assessment of the transaction underwriting. In one or more embodiments, the minimum score threshold is adjusted based on profit/loss performance of actual transaction underwriting activities under the transaction banking partnership. For example, the profit/loss performance may be determined based on occurrences of credit card chargeback events or default on paying back the advanced salary fund as described above.

If the determination in Step 204 indicates that the pre-determined criterion is met by the score of the entity, the method proceeds to Step 205, the transaction underwriter may decide to underwrite the requested transaction and determine particular details of the transaction underwriting agreement. In one or more embodiments, a customized transaction underwriting agreement (e.g., salary advance promissory note, merchant service agreement, etc.) may be sent to the transaction requestor for execution (i.e., authorized signing of signatures). Accordingly, an executed transaction underwriting agreement may be generated and sent to the transaction requestor prior to a financial institution providing the transaction fund, i.e., payment for the transaction.

If the determination in Step 204 indicates that the predetermined criterion is not met by the score of the entity, the method proceeds to Step 206, where the transaction request is declined.

Figure 3A:
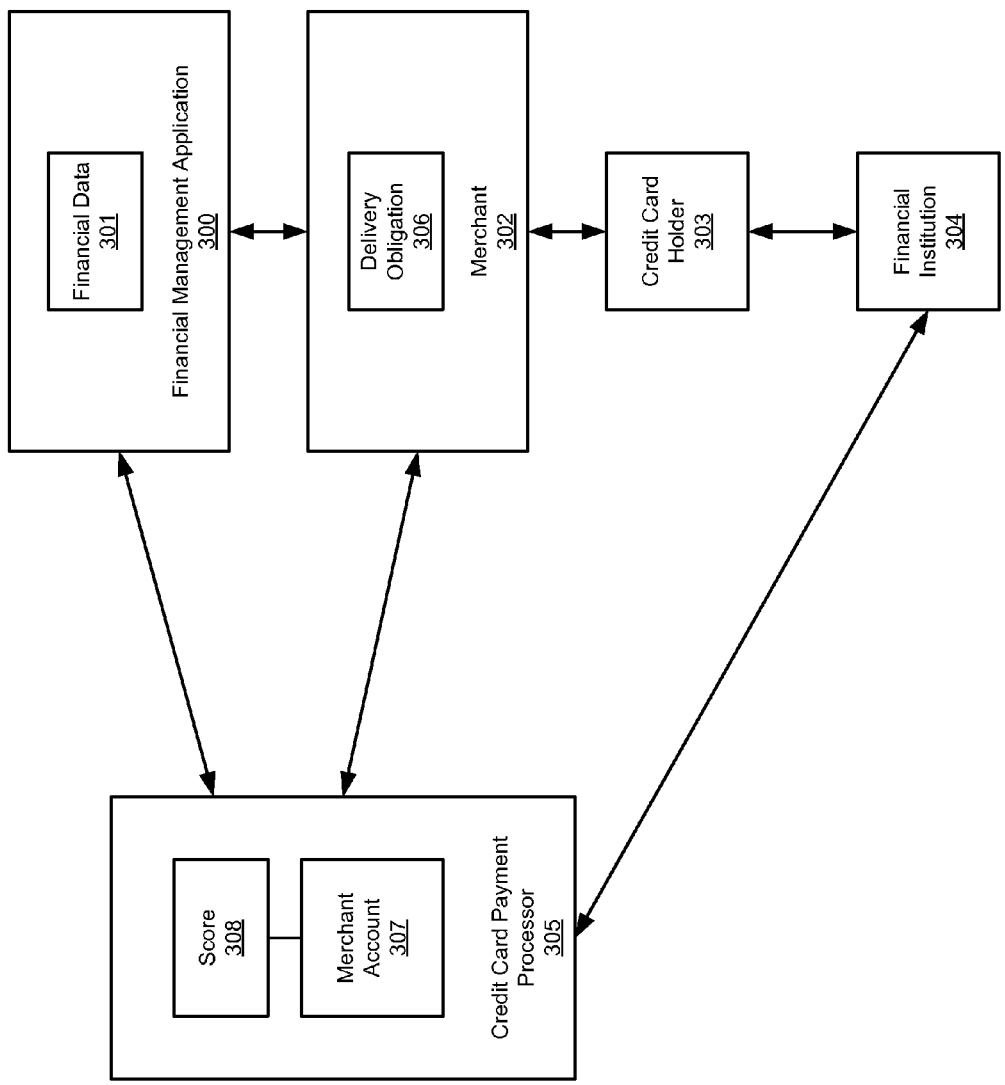
FIGS. 3A-3B show an example of data aggregation for banking partnerships in accordance in accordance with one or more embodiments of the invention.
Figure 3B:
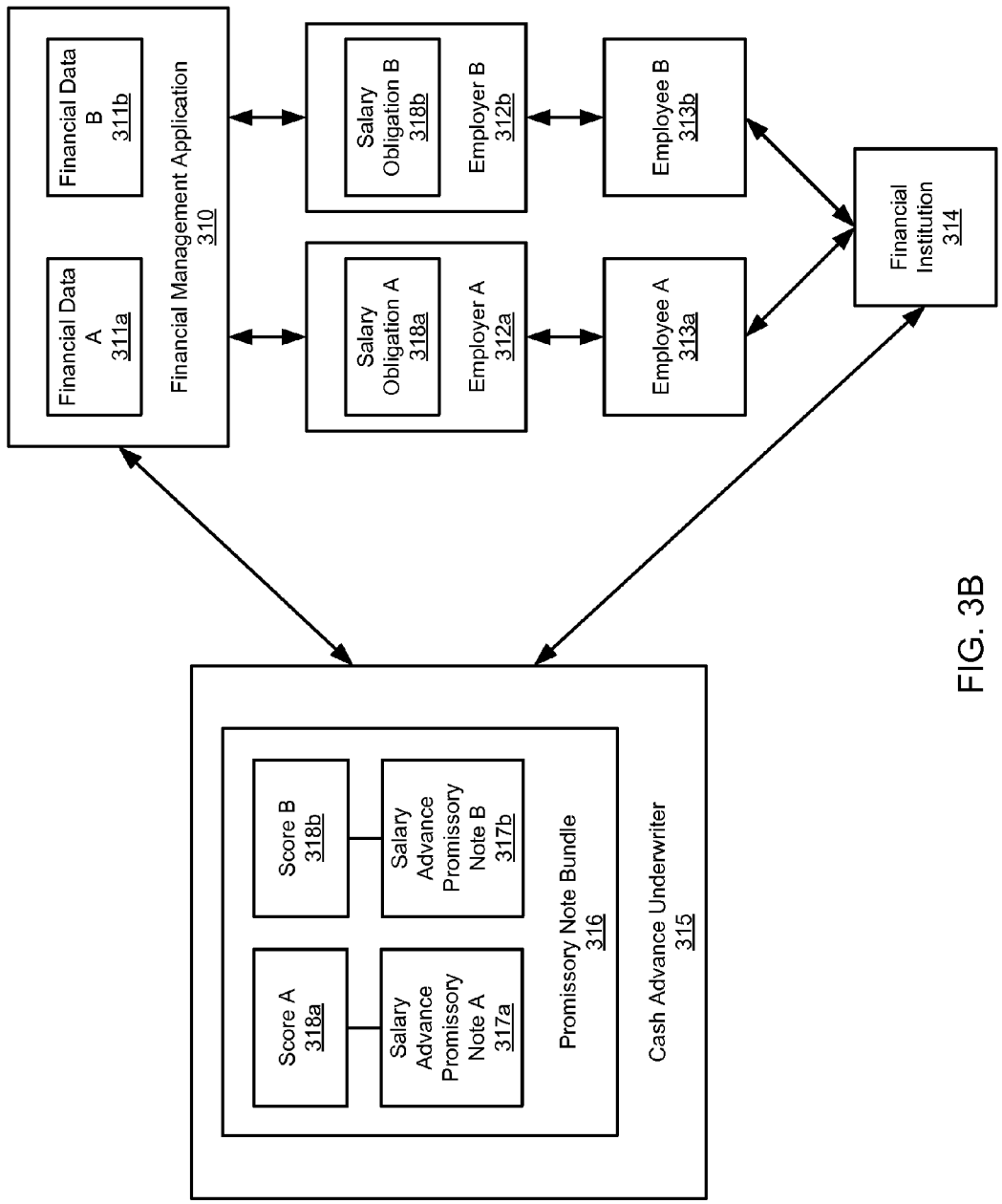

FIGS. 3A and 3B show an application example in accordance with one or more embodiments of the invention. This example application may be practiced using the system (100) of FIG. 1 and based on the method described with respect to FIG. 2 above.

As shown in FIG. 3A, the transaction requestor is a merchant (302) accepting credit card payment in a transaction to purchase an item from the merchant (302) by a credit card holder (303). In this context, the entity is the same merchant (302) and the business obligation is the delivery obligation (306) for delivering the item to the credit card holder (303) by the merchant (302) to complete the transaction. Further, the request for transaction includes requesting a merchant account (307) from the credit card merchant service provider (305) for processing the credit card payment. In this context, the credit card payment processor and/or ISO (305) is the transaction underwriter. The credit card payment includes a payment originating from the financial institution (304) and paid to the merchant (302) by the credit card payment processor and/or ISO (305) in response to the merchant (302) shipping the item and prior to the credit card holder (303) receiving the item. For example, the merchant (302) receives an order for the item from the credit card holder (303) and processes the credit card payment upon shipping the item. If the merchant (302) processes the credit card payment but fails to ship the correct item on time, the credit card holder (303) may initiate a dispute resulting in a chargeback event. Accordingly, the transaction underwriter (i.e., the credit card payment processor and/or ISO (305)) determines whether to approve the request for the merchant account (307) and provide merchant service to the requesting merchant (302) based on the score (308) assigned to the merchant (302). As described above, the score (308) is calculated based on financial data (301) obtained from the financial management application (300) used by the merchant (302) to manage its business activities.

The following is a step-by-step usage scenario from the perspective of a merchant service provider XYZ company (i.e., credit card payment processor and/or ISO (305)) evaluating a request from Bob's Building Supplies Inc. (i.e., merchant (302)) to open a merchant service account (i.e., merchant account (307)).

The sole proprietor Bob of Bob's Building Supplies Inc. submits an application to open a merchant service account, requesting a $5000 monthly credit limit with the merchant service provider XYZ Company. The XYZ Company already provides financial management applications for Bob's Building Supplies Inc. to manage its business activities. When applying for the merchant service account, Bob is asked to enter his user ID for the XYZ Company provided financial management applications, personal and business Tax ID numbers, etc.

XYZ Company's risk department takes Bob's information and in addition to running a credit check, they cross-reference his user ID and Tax ID numbers to quickly confirm that Bob's Building Supplies Inc. is a customer for payroll service, tax preparation service, and accounting service provided by the XYZ Company. In addition, Bob himself is also a customer for personal tax preparation service provided by the XYZ Company.

Based on this information, the risk department is able to calculate Bob's risk score (308) by using financial data (301) from various accounts of the payroll service, tax preparation service, and accounting service (e.g., provided through the financial management application (300)) used by Bob's Building Supplies Inc. as well as the financial data from Bob's personal tax preparation account to obtain a comprehensive view of Bob's business finances in combination with Bob's personal finances. The following are two scenarios of the comprehensive view.

Scenario #1:

The risk department notices in the new financial information that while Bob has a good credit score, he has a large amount of outstanding credit (both personal and business loans), typically has relatively low balances in his personal and business bank accounts (low coverage ratio) and his average total monthly sales are only around $3500. These aggregated data are evaluated to result in a relatively low score (308).

Based on the traditional credit score and additional information provided by the risk department, the underwriting department of the XYZ Company decides to approve Bob's application but reduces his monthly processing limit to $3000, with a pending review after 6 months to determine if his initial limit request should be granted.

After 6 months of good processing, the payment of some outstanding personal loans and with significant growth in Bob's business (avg. monthly sales increased to $5500), the XYZ company decides to increase Bob's limit to his initial request of $5000/month.

Scenario #2:

The risk department notices in the new financial information that while Bob has a low credit score, his business has a high cash flow, typically has high balances in his personal and business bank accounts (high coverage ratio) resulting in a high score (308). His low credit score was actually due to factors outside of his business success.

Despite the low traditional credit score, based on the additional information provided by the risk department, the underwriting department of the XYZ Company decides to approve Bob's application, creating a profitable customer that would have otherwise been rejected.

As shown in FIG. 3B, the transaction requestor is an employee A (313a) receiving salary from an employer A (312a) or an employee B (313b) receiving salary from an employer B (312b), where these two employers are the business entities. In this scenario, the business obligation is salary obligation A (318a) and salary obligation B (318b), which includes paying the salary to the employees according to applicable salary payment schedules. Further, the requests for transactions include requesting salary advances paid to the employees preceding the salary payment schedules. If either employer fails to issue the paychecks on time, the corresponding employee may not be able to pay back the advanced salary fund. Accordingly, the transaction underwriter (315) determines whether to approve the salary advance requests and present to the financial institution (314) for funding the salary advances based on the score A (318a) assigned to the employer A (312a) and the score B (318b) assigned to the employer B (312b). As described above, the score A (318a) and the score B (318b) are calculated based on financial data A (311a) and financial data B (311b) obtained from the financial management application (310) used by the employer A (312a) and the employer B (312b) to manage their business activities. In addition, the score A (318a) and the score B (318b) are further calculated based on financial data regarding the employee A (313a) and employee B (313b) obtained from a personal tax preparation application (not shown), the payroll application and a personal financial management application used by both employees. For example, the financial management application (310) and the personal tax preparation application may be provided by an application service provider to the employers and the employees. In some example, the application service provider may be the transaction underwriter (315) that creates the salary advance promissory note A (317a) and the salary advance promissory note B (317b) based on the score A (318a) and the score B (318b).

In the scenario described above, the executed transaction underwriting agreements are the salary advance promissory note A (317a) signed by the financial institution (314) and the employee A (313a) and the salary advance promissory note B (317b) signed by the financial institution (314) and the employee B (313b). The salary advance promissory note A (317a) and the salary advance promissory note B (317b) may be bundled in the promissory note bundle (316) based on the score A (318a) and the score B (318b) assigned to the employer A (312a) and employer B (312b), respectively. For example, if both of the score A (318a) and the score B (318b) are within the score range of 90 through 100, the promissory note bundle (316) may be designated as the premium grade bundle, if both of the score A (318a) and the score B (318b) are within the score range of 70 through 89, the promissory note bundle (316) may be designated as the regular grade bundle, if both of the score A (318a) and the score B (318b) are within the score range of 55 through 69, the promissory note bundle (316) may be designated as the high yield grade, if both of the score A (318a) and the score B (318b) are within the score range of 0 through 54, the promissory note bundle (316) may be designated as the not credit worthy grade. In a real life example, the employee A (313a) is Chris, who has worked for a 15 year old small business for 5 years. This company is in a stable industry and geography. Chris is requesting $2000 in salary advance and he earns much more than that each month in salary. Accordingly, his salary advance request is assigned a low score and the corresponding salary advance promissory note is assigned the premium grade.

Further, the salary advance promissory note bundle (316) is presented by the transaction underwriter (315) to the financial institution (314) for approval based on the grade. Still further, the transaction underwriter may facilitate payment of the salary advance in response to the financial institution (314) approving the salary advance promissory note bundle (316) and executing the salary advance promissory note A (317a) and the salary advance promissory note B (317b). For example, the financial institution (314) may be responsible for funding the salary advances and collecting scheduled payments from the employee A (313a) and employee B (313b) to pay back the advanced salary funds while the transaction underwriter (315) maintains customer service, relationship marketing, etc. with the employee A (313a) and employee B (313b).

Figure 4:
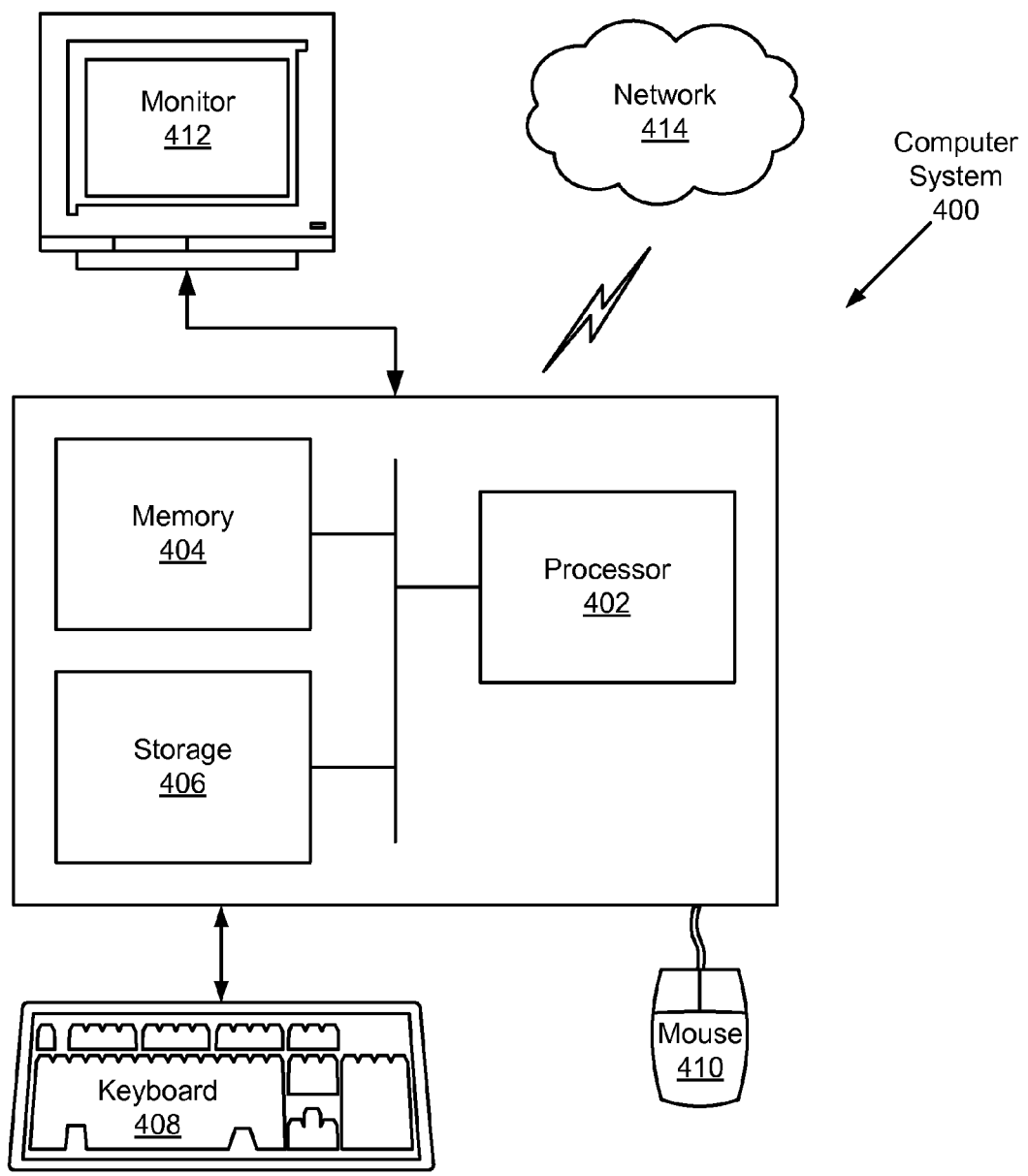
FIG. 4 shows a diagram of a computer in accordance with one or more embodiments of the invention.

Embodiments of the invention may be implemented on virtually any type of computer regardless of the platform being used. For example, as shown in FIG. 4, a computer system (400) includes one or more processor(s) (402) such as a central processing unit (CPU), integrated circuit, or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various elements of the AAD platform (122), the repository (125), etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system to manage risk for a transaction underwriter, comprising:
    a hardware processor;
    a plurality of financial management applications (FMAs) executing on the hardware processor and adapted to configure an accounting service account, a payroll service account, an inventory management account, a personal financial management account, and a tax preparation account to provide accounting service, payroll service, inventory management service, personal finance service, and tax preparation service, respectively, to an entity;
    an aggregated score calculator coupled to the plurality of FMAs, executing on the hardware processor, and adapted to:
        access the accounting service account, the payroll service account, the inventory management account, the personal financial management account and the tax preparation account to obtain accounting data, payroll data, inventory management data, personal finance data, and tax filing data, respectively, of the entity, and calculate a score based on the accounting data, the payroll data, the inventory management data, the personal finance data, and the tax filing data using a pre-determined formula, wherein the score represents an ability of the entity to fulfill a business obligation;

a transaction underwriting application coupled to the aggregated score calculator, executing on the hardware processor, and adapted to:
   receive a request for a transaction from a transaction requestor,
      wherein the entity is a third party to the transaction, and
      wherein fulfilling a financial obligation of the transaction by the transaction requestor is dependent on fulfilling the business obligation by the entity,
   evaluate, in response to the request, the score based on a pre-determined criterion, and
   send an executed transaction underwriting agreement to the transaction requestor in response to the score satisfying the pre-determined criterion; and a repository configured to store the accounting data, the payroll data, the inventory management data, the personal finance data, the tax filing data and the score.

2. The system of claim 1,
wherein the transaction requestor is a merchant accepting credit card payment in a transaction to purchase an item from the merchant by a credit card holder,
wherein the entity is the merchant and the business obligation comprises delivering the item to the credit card holder by the merchant to complete the transaction, and
wherein the request for transaction comprises requesting a merchant account for processing the credit card payment, the credit card payment comprising a payment paid to the merchant in response to the merchant shipping the item and prior to the credit card holder receiving the item, and
wherein the executed transaction underwriting agreement is a merchant service agreement signed by the transaction underwriter and the merchant, the merchant service agreement representing a contractual arrangement of using the merchant account to process the credit card payment for the merchant by the transaction underwriter.

3. The system of claim 2, the transaction underwriting application further configured to:
create, in response to sending the executed transaction underwriting agreement, the merchant account for the merchant.

4. The system of claim 1,
wherein the transaction requestor is an employee receiving salary from an employer,
wherein the entity is the employer and the business obligation comprises paying the salary to the employee according to a salary payment schedule,
wherein the request for transaction comprises requesting a salary advance paid to the employee preceding the salary payment schedule, and
wherein the executed transaction underwriting agreement is a salary advance promissory note signed by a financial institution and the employee, the salary advance promissory note representing a contractual arrangement of the salary advance.

5. The system of claim 4, the transaction underwriting application further configured to:
create the salary advance promissory note representing a contractual arrangement of the salary advance;
determine a grade of the salary advance promissory note based at least on the score of the entity;
present the salary advance promissory note to the financial institution for approval based on the grade; and
facilitate payment of the salary advance in response to the financial institution approving the salary advance promissory note.

6. The system of claim 4, the transaction underwriting application further configured to:
include the salary advance promissory note in a plurality of salary advance promissory notes associated with a plurality of employees receiving salaries from a plurality of employers, wherein the plurality of employees comprise the employee and the plurality of employers comprise the employer; and
determine an aggregated grade of the plurality of salary advance promissory notes based at least on a plurality of scores of a plurality of business entities, wherein the plurality of scores comprise the score and the aggregated grade comprises the grade.

7. The system of claim 6, wherein the plurality of scores are within a pre-determined range.

8. The system of claim 1, wherein the accounting data, the payroll data, and the inventory management data comprises at least one selected from a group consisting of cash flow/working capital ratio, length of business tenure, number of employees, industry category, business location, account balances, credit card processing data, debit card processing data, inventory turnover ratio, receivables schedule, and transaction types.

9. A method to manage risk for a transaction underwriter, comprising:
determining, on a hardware processor of a computer system, a score of the entity by:
   accessing an accounting service account, a payroll service account, a inventory management account, a personal financial management account, and a tax preparation account to obtain accounting data, payroll data, inventory management data, personal finance data, and tax filing data, respectively, of a entity, and
   calculating the score based on the accounting data, the payroll data, the inventory management data, the personal finance data, and the tax filing data using a pre-determined formula representing an ability of the entity to fulfill a business obligation;
receiving, by the transaction underwriter, a request for a transaction from a transaction requestor,
   wherein the entity is a third party to the transaction, and
   wherein fulfilling a financial obligation of the transaction by the transaction requestor is dependent on fulfilling the business obligation by the entity;
evaluating, in response to the request, the score based on a pre-determined criterion; and
sending an executed transaction underwriting agreement to the transaction requestor in response to the score satisfying the pre-determined criterion.

10. The method of claim 9,
wherein the transaction requestor is a merchant accepting credit card payment in a transaction to purchase an item from the merchant by a credit card holder,
wherein the entity is the merchant and the business obligation comprises delivering the item to the credit card holder by the merchant to complete the transaction,
wherein the request for transaction comprises requesting a merchant account for processing the credit card payment, the credit card payment comprising a payment paid to the merchant in response to the merchant shipping the item and prior to the credit card holder receiving the item, and wherein the executed transaction underwriting agreement is a merchant service agreement signed by the transaction underwriter and the merchant, the merchant service agreement representing a contractual arrangement of using the merchant account to process the credit card payment for the merchant by the transaction underwriter.

11. The method of claim 10, further comprising:
creating, in response to sending the executed transaction underwriting agreement, the merchant account for the merchant.

12. The method of claim 9,
wherein the transaction requestor is an employee receiving salary from an employer,
wherein the entity is the employer and the business obligation comprises paying the salary to the employee according to a salary payment schedule,
wherein the request for transaction comprises requesting a salary advance paid to the employee preceding the salary payment schedule, and
wherein the executed transaction underwriting agreement is a salary advance promissory note signed by a financial institution and the employee, the salary advance promissory note representing a contractual arrangement of the salary advance.

13. The method of claim 12, further comprising:
creating the salary advance promissory note;
determining a grade of the salary advance promissory note based at least on the score of the entity;
presenting the salary advance promissory note to the financial institution for approval based on the grade; and
facilitating payment of the salary advance in response to the financial institution approving the salary advance promissory note.

14. The method of claim 12, further comprising:
including the salary advance promissory note in a plurality of salary advance promissory notes associated with a plurality of employees receiving salaries from a plurality of employers, wherein the plurality of employees comprise the employee and the plurality of employers comprise the employer; and
determining an aggregated grade of the plurality of salary advance promissory notes based at least on a plurality of scores of the plurality of business entities, wherein the plurality of scores comprise the score and the aggregated grade comprises the grade.

15. The method of claim 14, wherein the plurality of scores are within a pre-determined range.

16. The method of claim 9, wherein the accounting data, the payroll data, and the inventory management data comprises at least one selected from a group consisting of cash flow/working capital ratio, length of business tenure, number of employees, industry category, business location, account balances, credit card processing data, debit card processing data, inventory turnover ratio, receivables schedule, and transaction types.

17. A non-transitory computer readable medium storing instructions to manage risk for a transaction underwriter, the instructions when executed by a computer comprising functionality to:
determine a score of the entity by:
accessing an accounting service account, a payroll service account, an inventory management account, a personal financial management account, and a tax preparation account to obtain accounting data, payroll data, inventory management data, personal finance data, and tax filing data, respectively, of a entity, and
calculating the score based on the accounting data, the payroll data, the inventory management data, the personal finance data, and the tax filing data using a pre-determined formula representing an ability of the entity to fulfill a business obligation;
receive, by the transaction underwriter, a request for a transaction from a transaction requestor,
wherein the entity is a third party to the transaction, and
wherein fulfill a financial obligation of the transaction by the transaction requestor is dependent on fulfilling the business obligation by the entity;
evaluate, in response to the request, the score based on a pre-determined criterion; and
send an executed transaction underwriting agreement to the transaction requestor in response to the score satisfying the pre-determined criterion.

18. The non-transitory computer readable medium of claim 17,
wherein the transaction requestor is a merchant accepting credit card payment in a transaction to purchase an item from the merchant by a credit card holder,
wherein the entity is the merchant and the business obligation comprises delivering the item to the credit card holder by the merchant to complete the transaction,
wherein the request for transaction comprises requesting a merchant account for processing the credit card payment, the credit card payment comprising a payment paid to the merchant in response to the merchant shipping the item and prior to the credit card holder receiving the item, and
wherein the executed transaction underwriting agreement is a merchant service agreement signed by the transaction underwriter and the merchant, the merchant service agreement representing a contractual arrangement of using the merchant account to process the credit card payment for the merchant by the transaction underwriter.

19. The non-transitory computer readable medium of claim 18, the instructions when executed by a computer further comprising functionality to:
create, in response to sending the executed transaction underwriting agreement, the merchant account for the merchant.

20. The non-transitory computer readable medium of claim 19,
wherein the transaction requestor is an employee receiving salary from an employer,
wherein the entity is the employer and the business obligation comprises paying the salary to the employee according to a salary payment schedule,
wherein the request for transaction comprises requesting a salary advance paid to the employee preceding the salary payment schedule, and
wherein the executed transaction underwriting agreement is a salary advance promissory note signed by a financial institution and the employee, the salary advance promissory note representing a contractual arrangement of the salary advance.

21. The non-transitory computer readable medium of claim 20, the instructions when executed by a computer further comprising functionality to:
create the salary advance promissory note;
determine a grade of the salary advance promissory note based at least on the score of the entity;

present the salary advance promissory note to the financial institution for approval based on the grade; and facilitate payment of the salary advance in response to the financial institution approving the salary advance promissory note.

22. The non-transitory computer readable medium of claim 20, the instructions when executed by a computer further comprising functionality to:

include the salary advance promissory note in a plurality of salary advance promissory notes associated with a plurality of employees receiving salaries from a plurality of employers, wherein the plurality of employees comprise the employee and the plurality of employers comprise the employer; and determine an aggregated grade of the plurality of salary advance promissory notes based at least on a plurality of scores of the plurality of business entities, wherein the plurality of scores comprise the score and the aggregated grade comprises the grade.

23. The non-transitory computer readable medium of claim 22, wherein the plurality of scores are within a pre-determined range.

24. The non-transitory computer readable medium of claim 17, wherein the accounting data, the payroll data, and the inventory management data comprises at least one selected from a group consisting of cash flow/working capital ratio, length of business tenure, number of employees, industry category, business location, account balances, credit card processing data, debit card processing data, inventory turnover ratio, receivables schedule, and transaction types.

* * * * *